Figure 1:
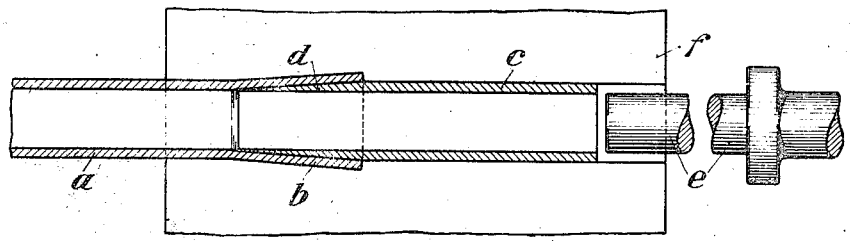

O. KLINCK.
METHOD FOR WELDING PIPE ENDS.
APPLICATION FILED SEPT. 22, 1914.

1,162,698.

Patented Nov. 30, 1915.

WITNESSES:
George Du Boy
Henry Ruhl

INVENTOR
Oswald Klinck
BY
ATTORNEYS

UNITED STATES PATENT OFFICE.

OSWALD KLINCK, OF MÜLHEIM-ON-THE-RUHR, GERMANY, ASSIGNOR, BY MESNE ASSIGNMENTS, TO LOCOMOTIVE SUPERHEATER COMPANY, OF NEW YORK, N. Y., A CORPORATION OF DELAWARE.

METHOD FOR WELDING PIPE ENDS.

1,162,698.   Specification of Letters Patent.   Patented Nov. 30, 1915.

Application filed September 22, 1914. Serial No. 863,054.

*To all whom it may concern:*

Be it known that I, OSWALD KLINCK, a subject of the King of Prussia, Emperor of Germany, residing at Mülheim-on-the-Ruhr, Rhenish Prussia, Germany, have invented certain new and useful Improvements in Methods for Welding Pipe Ends, of which the following is a specification.

My invention relates to a method by means of which pipe ends are brought in alinement and by properly heating them and applying pressure are welded together.

The object of the invention is to maintain everywhere at the joint an internal cross section and diameter equal to that of the pipes themselves.

A further object of the invention is to produce, in a quick efficient and inexpensive manner, joints of a substantial strength.

My improved method for welding pipe ends consists in shaping the pipe ends to be united in such a manner that a very great contact surface at the joint is obtained which is very essential for the welding. To accomplish that purpose according to one form of my invention, I expand either the one pipe end or bevel, *i. e.*, feather end, the other pipe and fit the one into the other after heating one or both ends. That may be done in any well known manner. In performing this operation the internal diameter of the male end must be slightly lessened. After the fitting the joint thus produced is heated up to the welding point, then inserted into a properly shaped die and thereupon pressure is applied to the joint from the inside. For applying pressure from the interior I prefer to use a mandrel forced into the pipe ends. Instead of heating the joint, both the pipe ends may be brought to welding heat before being inserted into each other.

The application of pressure from the inside renders my improved method specially adaptable for uniting return bends or caps with pipe lengths of superheater elements which are required to be disposed very close together since in such cases, it is impracticable to apply welding pressures from the outside. Up to now therefore the autogenous method of welding is generally used where joints of this kind are needed. This method of attaching pipe lengths, besides being very expensive, entails a loss of time. Moreover it has the drawback that by reason of the welding material accumulating in the interior of the joint, the inner diameter of the joint is decreased. Furthermore, the quality of the welding depends on the skill, the ability and experience of the operator.

My invention will be better understood with reference to the accompanying drawings of which—

Figure 2:
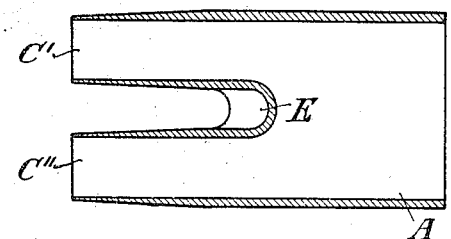
Figure 3:
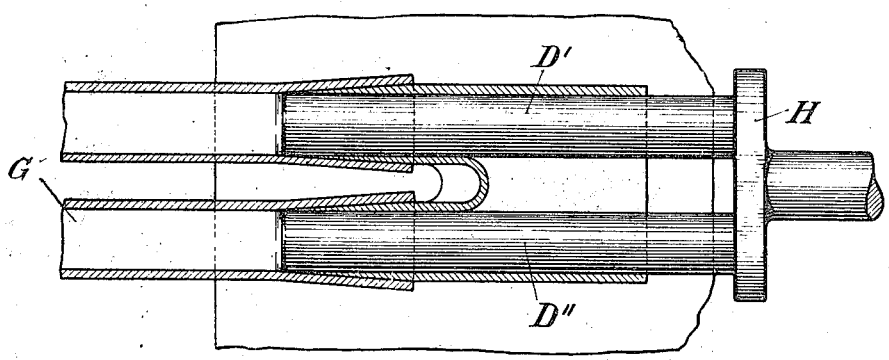
Figure 4:
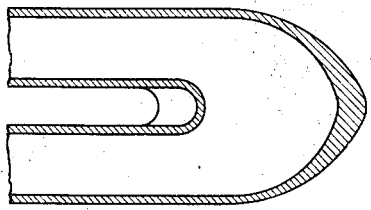

Figure 1 is a plan view, part in section, of pipe ends, mandrel and die, the latter with its upper half removed just before starting the last step of my process. Fig. 2 is a transverse section of a cap to be welded to two pipe lengths for producing return bends. Fig. 3 is a plan view, part section, representing pipe ends, cap, mandrel and dies just after completion of the welding. Fig. 4 represents a transverse section of a finished return bend.

Referring to Fig. 1 the pipe *a* is provided on its end *b* with an expansion. This expansion can be obtained in a well-known manner as *e. g.* by forcing into the heated pipe end a mandrel having a conical end piece. Pipe *c* shows a feathered end *d* fitting closely into the expansion of pipe *a* which end may be obtained *e. g.* by any suitable means.

In order to unite the two pipe ends they are properly heated and then inserted into the die *f*. A mandrel *e* of a proper shape and cross section is thereupon forced into the pipe, say *c*, whereby pressure is applied to the joint. The inner diameter of the joint becomes thus equal to that of the pipes themselves, whereas the walls of the die contribute to maintain the exterior of the joint in its proper shape.

The succession of the several steps of my method can be varied in many different ways. I consider it most practical that the heat necessary for welding is applied after the pipe ends are fitted together but under some circumstances it might be advisable to heat the ends previously to the fitting.

For the strength of the joint it is of importance that the contact surface of the two ends be of considerable extent. By my improved method this can easily be obtained by beveling (feather ending) and expanding respectively the ends of the pipes according to the pressure which the joint has to sustain.

For attaching one or more return bends to pipe lengths as in constructing superheater elements e. g., in which the pipe lengths may be disposed very close together, I am able by my improved method to produce a return bend from a suitable cap or a short piece of a circular tube and secure it to the pipe length. In doing so I proceed in the following manner: I take a breeches-like cap, i. e., a cap having a sub-oval cross section on the one end and being formed into two sockets or legs on the other end. A method of producing such a cap is e. g. described in the pending application Ser. No. 744552, January 27th 1913. The sockets C', C'' which are connected by a web or flange E (Fig. 3) are beveled at their outer ends to such a degree that by inserting them in correspondingly expanded ends F of pipes G they may fit closely. For applying pressure from the inside I prefer to use a mandrel D consisting of two equally shaped legs D' D'' which are connected and properly distanced by a base plate H. By this base plate H a uniform pressure is simultaneously transmitted to both legs D' and D'' of the mandrel. The welding is done by fitting the legs C' C'' of the cap A into the expanded ends of the pipes G, properly heating the joints, inserting them into a suitable shaped die K and forcing the legs D' D'' of the mandrel D through the joints (see Fig. 3). After the welding the cap A is closed in any suitable manner and, if desirable, reinforced at the apex as shown in Fig. 4.

While the heretobefore disclosed embodiment of my invention comprises the method whereby the legs or sockets C' C'' of the cap A are beveled at their ends and inserted into expanded ends of the pipes G, it must be understood that it is also possible to provide the expanded ends on the legs C' C'' and the beveled ends on the pipes G.

I have described my improved method as comprising different steps in a predetermined succession but it must be understood that said order may be varied at will without departing from the scope of my invention. The form of the dies, the mandrels, etc., may likewise be altered to suit the prevailing conditions with regard to the form, dimensions and strength of the article to be manufactured.

Having described my invention what I claim is:

1. The method of making U shaped pipe bends from two pipe lengths and a cap provided with two sockets which comprises shaping and forcibly fitting an end of each pipe and a socket, one within the other, heating the joints thus produced to welding heat, holding said joints in a die and simultaneously forcing a mandrel through each joint.

2. The method of making U shaped pipe bends from two pipe lengths and a cap open at one end and having two tubular legs at the other end, which comprises forming an end of each pipe and the two leg ends so that they will fit together as male and female members, fitting said ends together and forcing a pair of integrally connected mandrels through the joints thus formed while at welding heat, and finally closing the open end of the cap.

In testimony whereof, I have hereunto set my hand in the presence of two subscribing witnesses.

OSWALD KLINCK. [L. S.]

Witnesses:
HELEN NUFER,
ALBERT NUFER.